US008615471B2

(12) United States Patent
Hannigan et al.

(10) Patent No.: US 8,615,471 B2
(45) Date of Patent: Dec. 24, 2013

(54) METHODS AND RELATED TOY AND GAME APPLICATIONS USING ENCODED INFORMATION

(75) Inventors: Brett T Hannigan, Philadelphia, PA (US); Ravi K Sharma, Hillsboro, OR (US); Tony F Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 169 days.

(21) Appl. No.: 12/400,476

(22) Filed: Mar. 9, 2009

(65) Prior Publication Data

US 2010/0062819 A1 Mar. 11, 2010

Related U.S. Application Data

(63) Continuation of application No. 10/139,147, filed on May 2, 2002, now Pat. No. 7,502,759.

(60) Provisional application No. 60/288,272, filed on May 2, 2001, provisional application No. 60/297,229, filed on Jun. 7, 2001, provisional application No. 60/355,856, filed on Feb. 10, 2002.

(51) Int. Cl.
*G06F 17/00* (2006.01)

(52) U.S. Cl.
USPC .......... 705/51; 705/500; 463/1; 463/5; 463/36

(58) Field of Classification Search
USPC ........................................ 705/51, 500; 463/1
See application file for complete search history.

(56) References Cited

U.S. PATENT DOCUMENTS

| 4,659,919 A | 4/1987 | Price |
| 4,807,031 A | 2/1989 | Broughton et al. |
| 4,846,693 A | 7/1989 | Baer |
| 5,013,047 A | 5/1991 | Schwab |
| 5,026,058 A | 6/1991 | Bromley |

(Continued)

FOREIGN PATENT DOCUMENTS

| EP | 0493 091 | 7/1992 |
| WO | WO97/43736 | 11/1997 |

(Continued)

OTHER PUBLICATIONS

U.S. Appl. No. 09/343,104, filed Jun. 29, 1999, Tony F. Rodriguez, et al.

(Continued)

*Primary Examiner* — Calvin Hewitt
*Assistant Examiner* — John M Winter

(57) ABSTRACT

The presently claimed invention relates generally to toys and games that are enhanced with encoded information. One claim recites a method of playing a computerized game including: receiving image or video representing a physical object, the physical object comprising information steganographically encoded therein, the information is carried by the physical object through alterations to data representing at least some features carried by the physical object; utilizing a multi-purpose processor configured to: analyze received image or video to decode information steganographically encoded therein; interrogate a database or storage location with at least some of the information to obtain at least one game attribute associated with information; and modify the at least one game attribute to reflect activity during play of the computerized game. Of course, other claims and combinations are provided as well.

19 Claims, 5 Drawing Sheets

(56) References Cited

U.S. PATENT DOCUMENTS

| | | |
|---|---|---|
| 5,174,759 A | 12/1992 | Preston et al. |
| 5,189,630 A | 2/1993 | Barstow et al. |
| 5,213,337 A | 5/1993 | Sherman |
| 5,314,336 A | 5/1994 | Diamond et al. |
| 5,411,259 A | 5/1995 | Pearson et al. |
| 5,450,490 A | 9/1995 | Jensen et al. |
| 5,451,054 A * | 9/1995 | Orenstein .................. 273/148 R |
| 5,466,158 A | 11/1995 | Smith, III et al. |
| 5,487,010 A | 1/1996 | Drake et al. |
| 5,517,336 A | 5/1996 | Molee |
| 5,533,124 A | 7/1996 | Smith et al. |
| 5,575,659 A | 11/1996 | King et al. |
| 5,612,943 A | 3/1997 | Moses et al. |
| 5,613,004 A | 3/1997 | Cooperman et al. |
| 5,617,119 A | 4/1997 | Briggs et al. |
| 5,640,193 A | 6/1997 | Wellner |
| 5,673,316 A | 9/1997 | Auerbach et al. |
| 5,687,236 A | 11/1997 | Moskowitz et al. |
| 5,689,561 A | 11/1997 | Pace |
| 5,742,845 A | 4/1998 | Wagner |
| 5,743,801 A | 4/1998 | Welander |
| 5,748,731 A | 5/1998 | Shepherd |
| 5,754,981 A | 5/1998 | Veeneman et al. |
| 5,761,686 A | 6/1998 | Bloomberg |
| 5,778,102 A | 7/1998 | Sandford, II et al. |
| 5,795,213 A | 8/1998 | Goodwin |
| 5,810,666 A | 9/1998 | Mero et al. |
| 5,813,861 A | 9/1998 | Wood |
| 5,825,892 A | 10/1998 | Braudaway et al. |
| 5,832,119 A | 11/1998 | Rhoads |
| 5,835,639 A | 11/1998 | Honsinger et al. |
| 5,838,458 A | 11/1998 | Tsai |
| 5,841,978 A | 11/1998 | Rhoads |
| 5,853,327 A | 12/1998 | Gilboa |
| 5,855,483 A | 1/1999 | Collins |
| 5,859,920 A | 1/1999 | Daly et al. |
| 5,862,260 A | 1/1999 | Rhoads |
| 5,880,712 A | 3/1999 | Goldman |
| 5,892,900 A | 4/1999 | Ginter et al. |
| 5,899,700 A | 5/1999 | Williams et al. |
| 5,900,608 A | 5/1999 | Iida |
| 5,902,353 A | 5/1999 | Reber et al. |
| 5,905,248 A | 5/1999 | Russell et al. |
| 5,906,369 A | 5/1999 | Brennan et al. |
| 5,915,027 A | 6/1999 | Cox et al. |
| 5,933,798 A | 8/1999 | Linnartz |
| 5,940,595 A | 8/1999 | Reber et al. |
| 5,943,422 A * | 8/1999 | Van Wie et al. .................. 705/54 |
| 5,949,055 A | 9/1999 | Fleet et al. |
| 5,954,332 A | 9/1999 | Mero |
| 5,954,515 A | 9/1999 | Iggulden |
| 5,956,877 A | 9/1999 | Raasch et al. |
| 5,959,281 A | 9/1999 | Domiteaux |
| 5,974,548 A | 10/1999 | Adams |
| 5,978,773 A | 11/1999 | Hudetz et al. |
| 5,982,736 A | 11/1999 | Pierson |
| 6,031,914 A | 2/2000 | Tewfik et al. |
| 6,052,486 A | 4/2000 | Knowlton et al. |
| 6,076,734 A | 6/2000 | Dougherty et al. |
| 6,081,827 A | 6/2000 | Reber et al. |
| 6,082,774 A | 7/2000 | Schlauch |
| 6,108,656 A | 8/2000 | Durst et al. |
| 6,122,403 A | 9/2000 | Rhoads |
| 6,160,540 A | 12/2000 | Fishkin et al. |
| 6,164,534 A | 12/2000 | Rathus et al. |
| 6,190,174 B1 | 2/2001 | Lam |
| 6,200,216 B1 | 3/2001 | Peppel |
| 6,229,526 B1 | 5/2001 | Berstis |
| 6,229,924 B1 | 5/2001 | Rhoads et al. |
| 6,243,480 B1 | 6/2001 | Zhao et al. |
| 6,256,398 B1 | 7/2001 | Chang |
| 6,262,662 B1 | 7/2001 | Back et al. |
| 6,282,299 B1 | 8/2001 | Tewfik et al. |
| 6,307,949 B1 | 10/2001 | Rhoads |
| 6,309,690 B1 | 10/2001 | Brogger et al. |
| 6,311,214 B1 | 10/2001 | Rhoads |
| 6,332,031 B1 | 12/2001 | Rhoads et al. |
| 6,381,341 B1 | 4/2002 | Rhoads |
| 6,385,329 B1 | 5/2002 | Sharma et al. |
| 6,389,055 B1 | 5/2002 | August et al. |
| 6,408,082 B1 | 6/2002 | Rhoads et al. |
| 6,417,663 B1 | 7/2002 | Piernot et al. |
| 6,421,070 B1 | 7/2002 | Ramos et al. |
| 6,424,725 B1 | 7/2002 | Rhoads et al. |
| 6,449,377 B1 | 9/2002 | Rhoads |
| 6,456,725 B1 | 9/2002 | Cox et al. |
| 6,464,503 B1 | 10/2002 | Heit et al. |
| 6,510,234 B1 | 1/2003 | Cox et al. |
| 6,516,079 B1 | 2/2003 | Rhoads et al. |
| 6,522,770 B1 | 2/2003 | Seder et al. |
| 6,526,449 B1 | 2/2003 | Philyaw et al. |
| 6,535,617 B1 | 3/2003 | Hannigan et al. |
| 6,542,927 B2 | 4/2003 | Rhoads |
| 6,542,933 B1 | 4/2003 | Durst, Jr. et al. |
| 6,553,129 B1 | 4/2003 | Rhoads |
| 6,567,533 B1 | 5/2003 | Rhoads |
| 6,574,609 B1 | 6/2003 | Downs et al. |
| 6,580,808 B2 | 6/2003 | Rhoads |
| 6,590,996 B1 | 7/2003 | Reed et al. |
| 6,611,607 B1 | 8/2003 | Davis et al. |
| 6,612,501 B1 * | 9/2003 | Woll et al. .................. 235/494 |
| 6,614,914 B1 | 9/2003 | Rhoads et al. |
| 6,629,133 B1 | 9/2003 | Philyaw et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,709,336 B2 | 3/2004 | Siegel et al. |
| 6,718,046 B2 | 4/2004 | Reed et al. |
| 6,718,047 B2 | 4/2004 | Rhoads |
| 6,720,949 B1 | 4/2004 | Pryor et al. |
| 6,721,440 B2 | 4/2004 | Reed et al. |
| 6,735,324 B1 | 5/2004 | McKinley et al. |
| 6,737,957 B1 | 5/2004 | Petrovic et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,768,980 B1 | 7/2004 | Meyer et al. |
| 6,775,392 B1 | 8/2004 | Rhoads |
| 6,798,894 B2 | 9/2004 | Rhoads |
| 6,813,366 B1 | 11/2004 | Rhoads |
| 6,879,701 B1 | 4/2005 | Rhoads |
| 6,917,724 B2 | 7/2005 | Seder et al. |
| 6,920,232 B2 | 7/2005 | Rhoads |
| 6,947,571 B1 | 9/2005 | Rhoads et al. |
| 6,968,151 B2 | 11/2005 | Redford et al. |
| 6,975,746 B2 | 12/2005 | Davis et al. |
| 6,983,057 B1 | 1/2006 | Ho et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,065,228 B2 | 6/2006 | Brundage |
| 7,095,871 B2 | 8/2006 | Jones et al. |
| 7,111,170 B2 | 9/2006 | Hein et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,162,052 B2 | 1/2007 | Brundage et al. |
| 7,164,413 B2 | 1/2007 | Davis et al. |
| 7,164,780 B2 | 1/2007 | Brundage et al. |
| 7,171,016 B1 | 1/2007 | Rhoads |

(56) References Cited

U.S. PATENT DOCUMENTS

| | | | |
|---|---|---|---|
| 7,174,031 B2 | 2/2007 | Rhoads et al. |
| 7,177,443 B2 | 2/2007 | Rhoads |
| 7,188,186 B1 | 3/2007 | Meyer et al. |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,379,566 B2 | 5/2008 | Hildreth |
| 7,391,880 B2 | 6/2008 | Reed et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,502,759 B2 | 3/2009 | Hannigan et al. |
| 7,505,823 B1 | 3/2009 | Bartlett et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,542,654 B2 | 6/2009 | Iwashita et al. |
| 7,545,952 B2 | 6/2009 | Brundage et al. |
| 7,564,992 B2 | 7/2009 | Rhoads |
| 7,570,781 B2 | 8/2009 | Rhoads et al. |
| RE40,919 E | 9/2009 | Rhoads |
| 7,602,978 B2 | 10/2009 | Levy et al. |
| 7,607,016 B2 | 10/2009 | Brunk et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Jones et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,945,781 B1 | 5/2011 | Rhoads |
| 2001/0001854 A1 | 5/2001 | Schena et al. |
| 2001/0011233 A1 | 8/2001 | Narayanaswami |
| 2001/0034257 A1* | 10/2001 | Weston et al. ............... 463/1 |
| 2001/0034705 A1 | 10/2001 | Rhoads et al. |
| 2001/0047426 A1 | 11/2001 | Hunter |
| 2001/0055407 A1 | 12/2001 | Rhoads |
| 2002/0006212 A1 | 1/2002 | Rhoads et al. |
| 2002/0009208 A1 | 1/2002 | Alattar et al. |
| 2002/0018879 A1 | 2/2002 | Barnhart et al. |
| 2002/0036617 A1 | 3/2002 | Pryor |
| 2002/0049967 A1 | 4/2002 | Haseltine |
| 2002/0080271 A1 | 6/2002 | Eveleens et al. |
| 2002/0131076 A1 | 9/2002 | Davis |
| 2002/0133818 A1 | 9/2002 | Rottger |
| 2002/0141310 A1 | 10/2002 | Stephany et al. |
| 2002/0153661 A1 | 10/2002 | Brooks et al. |
| 2002/0155893 A1 | 10/2002 | Swanberg et al. |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0169581 A1 | 9/2004 | Petrovic et al. |
| 2004/0190750 A1 | 9/2004 | Rodriguez et al. |
| 2004/0199387 A1 | 10/2004 | Wang et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2005/0262350 A1 | 11/2005 | Boutant et al. |
| 2006/0009287 A1 | 1/2006 | Engelfriet |
| 2006/0013435 A1 | 1/2006 | Rhoads |
| 2006/0041591 A1 | 2/2006 | Rhoads |
| 2006/0064645 A1 | 3/2006 | Neven et al. |
| 2006/0251291 A1 | 11/2006 | Rhoads |
| 2007/0055884 A1 | 3/2007 | Rhoads |
| 2007/0104348 A1 | 5/2007 | Cohen |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| WO | WO00/07356 | 2/2000 |
| WO | WO00/26749 | 5/2000 |
| WO | WO01/61987 | 8/2001 |
| WO | WO01/75629 | 10/2001 |
| WO | WO01/84438 | 11/2001 |
| WO | WO02/03328 | 1/2002 |

OTHER PUBLICATIONS

U.S. Appl. No. 09/343,101, filed Jun. 29, 1999, Bruce L. Davis, et al.

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,009, filed Oct. 25, 2000, Bruce L. Davis, et al.

U.S. Appl. No. 09/697,015, filed Oct. 25, 2000, Bruce L. Davis, et al.

(56) References Cited

OTHER PUBLICATIONS

U.S. Appl. No. 13/084,981, filed Apr. 12, 2011, Geoffrey B. Rhoads.
1999 NFL Rookies Featured in Upper Deck's PowerDeck Lineup, Upper Deck press release, Aug. 17, 1999, 2 pages.
Acken, "How Watermarking Adds Value to Digital Content," Communications of the ACM, vol. 41, No. 7, Jul. 1998, pp. 75-77.
Alattar, "Smart Images Using Digimarc's Watermarking Technology," Proc. SPIE vol. 3971, No. 25, Jan. 25, 2000, pp. 1-10.
Arai et al., Retrieving Electronic Documents with Real-World Objects on InteractiveDESK, Nov. 14, 1995, UIST '95, pp. 37-38.
Arai et al., "InteractiveDESK: A Computer-Augmented Desk Which Responds to Operations on Real Objects," CHI '95 Mosaic of Creativity, May 7-11, 1995, pp. 141-142.
U.S. Appl. No. 09/571,422, filed May 15, 2000, Rhoads et al.
U.S. Appl. No. 09/630,243, filed Jul. 30, 2000, McKinley et al.
U.S. Appl. No. 09/709,255, filed Nov. 8, 2000, Hannigan et al.
U.S. Appl. No. 60/288,272, filed May 2, 2001, Sharma et al.
U.S. Appl. No. 60/297,229, filed Jun. 7, 2001, Hannigan et al.
U.S. Appl. No. 60/355,856, filed Feb. 10, 2002, Hannigan et al.
"Digimarc Turns Online Images Into Powerful Marketing Agents," Digimarc press release, Jul. 20, 1998, 3 pages.
Ljungstrand et al., "WebStickers: Using Physical Tokens to Access, Manage and Share Bookmarks to the Web," DARE 2000, Apr. 12, 2000, 9 pages.
McDonald, "Making a MARC: Digimarc's MediaBridge Fastens print advertising to the Internet," Publishing & Production Executive, vol. 14, No. 6, Jun. 2000, pp. 40, 42 and 44.
"Newly Released Magic: The Gathering Interactive Encyclopedia CD-ROM Makes Every Magic Card Ever Printed Available for Electronic Play," Wizards of the Coast press release, Nov. 10, 1999, 2 pages.
"Overlay Plug-In User's Guide," Plug-in Systems, 1996, 12 pages.
"Overlay Plugin for Packagizer™," Plug-In Systems brochure, a page, undated.
Rekimoto et al., "CyberCode: Designing Augmented Reality Environments with Visual Tags," DARE 2000, Apr. 12, 2000, 10 pages.
Rekimoto et al., "Augment-able Reality: Situation Communication Through Physical and Digital Spaces," Proc. of 2d Int. Symp. on Wearable Computers, Oct. 1998.
Sharma et al., "Practical Challenges for Digital Watermarking Applications," IEEE Fourth Workshop on Multimedia Signal Processing, Oct. 3, 2001, pp. 237-242.
Want et al., "Bridging Physical and Virtual Worlds with Electronic Tags," CHI 99, May 15, 1999, pp. 370-377.
Yeung et al., "Digital Watermarks: Shedding Light on the Invisible," IEEE Micro, vol. 18, No. 6, Nov./Dec. 1998, pp. 32-41.
Zhao et al., "In Business Today and Tomorrow," Communications of the ACM, vol. 41 No. 7, Jul. 1998, 67-72.
International Preliminary Examination Report in PCT/US02/13728, dated Nov. 26, 2003.

\* cited by examiner

METHODS AND RELATED TOY AND GAME APPLICATIONS USING ENCODED INFORMATION

RELATED APPLICATION DATA

This application is a continuation of U.S. application Ser. No. 10/139,147, filed May 2, 2002 (U.S. Pat. No. 7,502,759), which claims the benefit of U.S. Provisional Patent Application Nos. 60/288,272, filed May 2, 2001, 60/297,229, filed Jun. 7, 2001, and 60/355,856, filed Feb. 10, 2002. The Ser. No. 10/139,147 application is also related to U.S. patent application Ser. No. 09/630,243, filed Jul. 30, 2000 (U.S. Pat. No. 6,735,324). Each of these patent documents is hereby incorporated herein by reference.

TECHNICAL FIELD

The invention generally relates to steganography and data hiding. More particularly, the present invention relates to enhancing toys and games with steganography.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending U.S. application Ser. No. 09/503,881 and U.S. Pat. No. 6,122,403, which are herein incorporated by reference.

As computing power increases, and transmission and storage of digital information becomes more inexpensive, the amount of digital content will continue to exponentially increase. Digital watermarking provides a way to embed an imperceptible watermark into digital content. In addition, digital watermarks can also be embedded into traditional media such as printed material. Watermarks provide a way to communicate additional information about the watermarked medium (also called cover medium) and therefore enhance the value of the embedded medium. This additional information can be used for a variety of applications—security, content protection, authentication, data hiding, content tracking, enabling a link between content and provider, to name just a few. Digital watermarking offers a unique advantage since this information is imperceptibly bound to the cover medium and travels with it.

The present invention enhances games, books and toys through digital watermarking.

Further features will become apparent with reference to the following detailed description and accompanying drawings.

DETAILED DESCRIPTION

Figure 1:
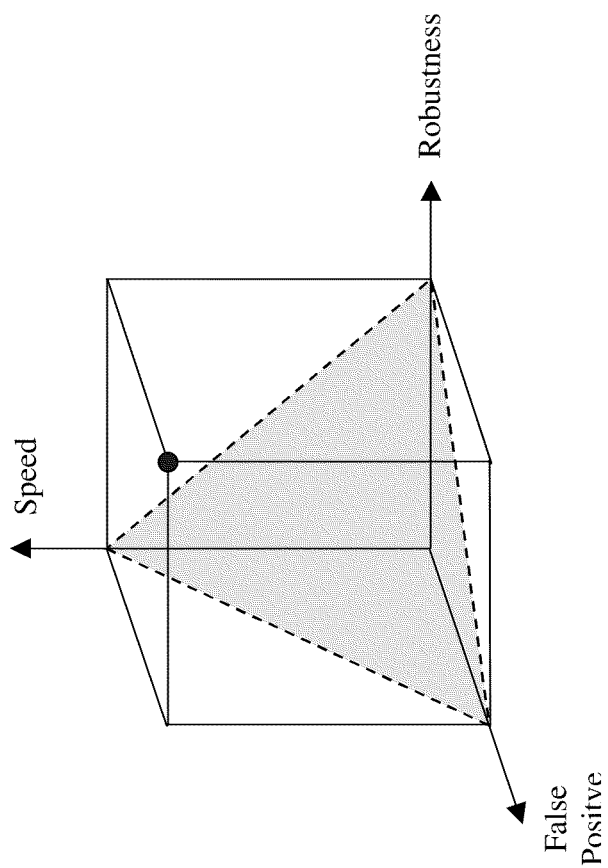
FIG. 1 is a diagram illustrating trade-offs in execution speed, robustness, and false positives in a digital watermark system.

Each digital watermarking application has its own set of requirements. These requirements determine which attributes of a watermarking system are essential for the application and drive the choice of techniques and algorithms used for embedding and detection. We briefly describe some important attributes (e.g., as discussed under headings A-J) for watermarking applications. It is important to note that not all attributes are required for every watermarking application. As we will see later, most applications need only a subset of attributes to satisfy the application requirements. Below, we describe attributes of watermarking systems in general. And in section K, we provide an example toy implementation. We note that the specific details and attributes discussed in section K are not needed for every toy or game application. A digital watermarking system is composed of two parts—a watermark embedder for inserting the watermark in a cover media file and a watermark detector for detecting the embedded watermark. As we will see, some attributes are specific to the embedder while others refer to the detector.

A. Robustness

Robustness refers to the ability of the watermark detector to detect the watermark under degradations. Robustness is measured in terms of detection rates (e.g., percentage of watermarked images successfully detected). Note that the need for robustness is also application-specific. For example fragile authentication watermarks are intended not to be robust. Robustness can be classified according to the type of degradations caused to the watermarked content.

1) Robustness to Common Manipulations

Most digital content has to be manipulated in some way for it to be consumed. Common manipulations of image content include brightness and contrast modifications, sharpening, blurring etc. For example, an image may be contrast enhanced before adding it to a web page. Sometimes content may have to be compressed for storage or transmission. Many watermarking applications require robustness to these manipulations.

2) Robustness to Geometric Distortions

Use of media content such as images often involves a change in geometry such as scaling (enlarging or reducing) the image, rotation, cropping, translation, mirroring, skew, etc. These operations are geometric transformations that distort the image. Robustness to geometric distortions means the ability to recover the watermark signal in the presence of geometric distortions. Some applications may require robustness against a limited set of geometric distortions or no robustness to geometric distortions at all. Video watermarks may need to be robust to other geometric transformations such as aspect ratio changes or frame-rate changes.

3) Robustness to D-A and A-D Conversions

With the advent of inexpensive printers and scanners, it is becoming easier to print digital images (digital to analog or D-A conversion) and to scan printed material to store in a digital form (analog to digital or A-D conversion). Some applications require that the watermark signal be robust to one or more print and scan operations. D-A and A-D conversions involve re-sampling, a potential loss in signal quality, and distortions of the power spectrum of the image.

4) Robustness to Malicious Attacks

This refers to the ability of the watermark to resist hostile attacks that are intended specifically to remove the watermark. It is important to distinguish between intentional attacks and common manipulations. Most users of a watermarking application are not likely to apply hostile attacks. Such attacks require special skills (e.g., signal processing and software engineering knowledge) to implement. Intentional attacks have been the topic of a significant body of research on digital watermarking. Not all watermarking applications are prone to intentional attacks.

B. Perceptibility

Regardless of the watermarking scheme employed, embedding a watermark in digital media such as an image or audio clip implies altering signal samples in some way. This alteration introduces distortions in the form of artifacts that may sometimes be perceptible to the user. Most watermarking applications require the watermark to be imperceptible. Visibility refers to the perceptibility of the watermark in image content. Visibility is affected by factors such as watermark strength, desired robustness and characteristics of the image. Visibility often competes with robustness and false positives. Greater robustness or fewer false positives require higher watermark strength and therefore greater visibility. Image watermarking systems often utilize properties of the human visual system (HVS) for reducing visibility.

The degree to which the watermark may acceptably distort the image is dependent upon many factors. The intended use has a major impact. An image designed to sell high-end cosmetics will tolerate much less distortion than one of a busy city scene. A highly textured graphical image will be more tolerant of distortion than will one full of specular reflections. Further, in the case of a printed image, the quality of the substrate and the printing process employed will set limits on the acceptable distortion of the host image.

C. Capacity

The watermark signal contains the payload that includes the bits to be communicated. Capacity refers to the size of the payload, measured in bits. As in any communication channel, an increase in capacity reduces the robustness. To explain this we first define a few terms. The payload is encoded using error correction coding schemes. This coded payload is further processed using spread spectrum techniques to generate the spread spectrum payload. Assume that the number of pixels available for embedding the spread spectrum payload is fixed. As capacity increases either the amount of coding or the spread has to decrease to accommodate the watermark. Reduction in the amount of error correction or the amount of spread usually results in decreased robustness.

D. Capacity Vs. Robustness

The amount of data the watermark carries is frequently in tension with the degree to which the watermark resists both normal and malicious attacks. For example, a large capacity can be achieved by replacing the least significant bits (LSB) of the cover medium with a watermark signal. However, LSB coding lacks robustness against operations such as printing and scanning, filtering and noisy transmission.

As with every signal detection scheme, the watermark detector will occasionally falsely detect the presence of a watermark when there is none. This false detection is termed a false positive. False positives can be measured by a false positive rate, which is the frequency of occurrence of detection in an unmarked cover media, e.g., 1 in 105. Most watermarking applications require the false positive rate to be low.

E. Speed and Computational Complexity

The speed of watermark embedding and detection is closely coupled with the computational complexity of the system. In an application with strict visibility constraints, the watermark embedder may employ computationally intensive HVS models to modulate watermark strength. This will increase embedding time. At the detector, there is a tradeoff between speed and robustness. A detector having lower speed requirements (and therefore more time) can employ additional signal processing operations (such as filtering) to increase robustness. Similarly there is a tradeoff between speed and false positives. Given more time for detection more processing may be performed to reduce the false positive rate.

F. Security

The security of the watermarking system becomes a key design parameter when the payload itself has intrinsic value as in the case of identity or financial information. Code security for the application, encryption of the data, or trusted third parties may be required as part of an overall system design. If the owner of the cover media wants the user to have embedded imperceptible digital data for the owner's or the customer's advantage, few security precautions will be required.

G. Trade-Offs Between Application Requirements

There is an inherent tradeoff between some of the attributes of digital watermarks discussed earlier. Watermark attributes such as robustness or false positive rate and speed often compete with each other. For example, if robustness to geometric distortions is desired, the speed of detection will decrease. The lower the speed requirement, more time can be spent in signal processing operations that provide increased robustness. Tradeoffs can be conceptually divided into two categories.

1) Embedder Trade-Offs

On the embedder side, the main tradeoffs are between perceptibility, capacity and speed. Visibility can be measured either subjectively or quantitatively. Subjective evaluation requires human intervention and is both expensive and time consuming. The degree to which human intervention in the embedding process is permitted, impacts both speed of embedding and visibility. Ideally, one would like to quantitatively measure how the change in visibility relates to robustness, so that the embedding software can select an optimum operating point automatically. Simple quantitative measures are based on mean squared error, more sophisticated measures may use perceptual metrics based on the HVS.

As described above, capacity is in tension with robustness. An increase in capacity usually comes at the cost of decreased robustness. Watermark strength (energy of the embedded signal) also affects both perceptibility and robustness. The effect of change in strength on visibility depends largely on the media characteristics. The watermark in a textured image may not be as visible when the strength is increased as in a relatively flat image. This is where HVS models will likely play a key role. The ability to automatically adapt visibility according to media characteristics without sacrificing robustness (or some other set of attributes) is a goal in embedder design.

2) Detector Trade-Offs

At the detector, robustness and false positives are competing attributes whose properties must be selected with speed of the system in mind. FIG. 1 illustrates the tension between these three attributes. The arrows on the three axes indicate increased robustness, increased speed and high false positive rejection (lower false positive rate). Ideally, we would like the detector to operate at the vertex of the cube marked by the circle so as to achieve the most robustness at the highest speed and maximum false positive rejection. However, due to the tension between the attributes the detector often has to work within the volume beneath the shaded triangle. If the required operating point on two axes are fixed then the value of the third axis is determined. Within this region, attempts to increase robustness come at the cost of speed and false positives and trade-offs have to be made to arrive at the operating point.

In systems where the image fed to the detector is always watermarked, the false positive requirement may not be critical and more emphasis could be given to robustness. For some systems a large majority of the images fed to the detector may be unmarked. In this case, false positive rates may be as critical as detection rates. Robustness and false positives are both competing with speed. Speed is often the most important factor. If the input to the detector is from a video camera, maintaining the frame-rate may sometimes be more important than high detection rates. In systems where speed is critical, fast detection comes at the cost of trade-offs in robustness and false positives.

H. Data Acquisition

Data acquisition is one of the basic aspects of a watermarking application that is often ignored in watermarking literature. The requirements will influence the mode of data acquisition. For example, is the input to the detector from an existing digital file or an analog source? Will the data be available once or will there be multiple opportunities to extract the payload? The choice of the data acquisition device, to a large extent, determines the choice of the watermarking technology and its capabilities. Two types of data acquisition devices that are becoming increasingly prevalent are low-cost PC cameras and low-cost PC scanners.

A low-cost PC camera provides an easy to use interface to capture an image or video sequence where the user just holds a printed version of the image or textured object up to a camera. However, given a camera input, the detector has to deal with issues such as lens distortion, lower resolution, focus issues, compression, image size, frame rate etc. In addition geometric distortions are introduced because the mechanism of holding the image up to the camera is not controlled.

A low-cost scanner provides a more controlled environment for the image to be captured. On the other hand, the interface is less flexible, less intuitive and cumbersome for repeated use. Since most scanners allow a whole range of capture resolution, the detector must be robust to re-sampling issues.

I. Choice of Synchronization Scheme

If the application requires robustness to geometric distortions, a scheme must be employed to register the acquired image with the watermark detector. To correctly read the embedded message, all message bits must be interpreted correctly. Thus, geometric distortions should be reversed or circumvented in the application. In the choice of a synchronization scheme, the degree of geometric robustness required, the presence or absence of mirrored or inverted images, and the expected degree of perspective distortions or differential scale, will all be key in determining the particular registration scheme employed.

J. Choice of Payload and Error Correction Scheme

Preferably the payload should be extendable and robust to errors. The payload is extendable by reserving payload bits for future use. Also, the error correction coding scheme allows a trade-off between robustness and bit capacity such that more bits can be carried in a given signal size at the expense of robustness to errors.

K. Toy Applications

The following discussion details novel toy and game applications of digital watermarking.

One aspect of this patent document is aimed at providing an interactive link between children's toys (or other objects including cards and documentation) and a computer (including computing devices like a video game console, personal digital assistant (PDA), set top box, Internet appliance, etc., etc.). The child's toy carries hidden digital information in a digital watermark that can inform the computer as to the nature of the object and its location and orientation (via scale and rotation parameters derived from detection). The digital watermark is embedded in an image imprinted on the toy (or in a sticker on the toy or surface texture of the toy) and can be supplemented with watermarked cards or objects that are supplied along with the packaging for the toy. The toy is based on a local database of actions and on information available on the Internet. A child is able to hold her or his toy in front of a tethered PC camera or wireless camera. The camera transmits the image data to the computer. Software on the PC performs watermark detection. On detection, a number of different actions are initiated as determined by the toy (or as intended by the toy manufacturer) or even as determined by the child's parents. These include:

Playing a video or audio clip to enhance the play value of the toy, or even playing the child's favorite video or audio.

Taking some action on the $N^{th}$ instance of detecting the toy.

Educating the child about something.

Registering the toy for warranty and support through an Internet connection.

Finding out about usage, features and accessories from the manufacturer's web site.

The software allows the actions to be programmable.

There are a variety of toys that can be based on this system architecture, including digitally watermarked flash cards, each bearing watermark messages associated with game or learning actions. Another example is a free-standing robot-like device with image and audio sensors for capturing digitally watermarked images and audio and a processor for detecting the digital watermark and identifying and manipulating objects based on actions associated with messages extracted from the watermark payloads.

As an example, we will describe the requirements for a toy with the following characteristics:

Age range: 3 to 7 years.

Play action: The toy includes an expandable set of vehicles, houses, stores, and other familiar neighborhood locales. Each toy component is watermarked. On first showing the toy to the PC Camera, the computer retrieves a short video and sound clip from either the local data base or the internet. For example, the sounds of a fire engine and a short clip about firefighting are played if the fire engine is shown to the computer via the PC camera. A different clip can be optionally played the second time the same object is shown.

The toy includes a starter kit with software and one or two digitally watermarked vehicles. An add-on kit includes additional watermarked vehicles and buildings.

The toy system uses the payload of the digital watermark on each toy to distinguish around 100 toys, each from about 50 manufacturers and to carry information about the age group for which it is intended.

The detection process is fast enough to preferably allow a frame-rate of about 10 frames per second (fps) when no digital watermarked object is held up to the camera. When a watermarked object is held up to the camera, the watermark payload is obtained in, e.g., less than two seconds.

If the game is running, and no watermarked image is held up to the camera, the action of the toy is unaffected for the length of time it takes to play a session of the game. For a frame rate of 10 frames per second and a play session of one hour, less than one false positive in $10^4$ is preferred for this example application.

The probability of wrongly detecting one toy as another is preferably less than 1 in $10^4$.

Detector software is customized to allow user-defined actions.

Camera and PC requirements already exist in the home.

Based on the requirements listed above, we can begin to define the attributes and understand the trade offs between them. Now we describe how these requirements drive various design considerations.

Visibility of Watermark

In the toy application, the watermark should not affect the artistic value the toy. As a watermark will be on a toy, this is an appropriate application where the cover medium can be adapted to suit the watermark. Toy vehicles and houses could be textured or stylized to maximize the ability to carry a watermark signal with minimum impact on visibility. Or a decorative sticker or artwork on the toy can include an embedded digital watermark.

Data Acquisition

In one implementation, a game is played by a child holding an object up to a PC camera. The toy software controls camera settings such as frame rate, compression, exposure and white balance as required. Given characteristics of the currently installed base of PC cameras, the watermark detection scheme and the play action of the toy are preferably designed to be not limited by a frame rate as slow as five frames per second for uncompressed data. The data acquisition does not impose physical manipulations in terms of requiring a precise presentation to the camera that are beyond the physical limitations of a three-year-old child. This requirement may be met via the intrinsic robustness of the capture system or via mechanical aids provided with the game to assist in positioning the watermarked image, such as an object or cardholder into which the child places the toy in front of the camera. A typical PC camera has a 480×640 pixel image size. Lower resolutions may typically be selected down to 120×160 pixels. Typical imagers have pixels about 9 um on a side. At a typical focal length of 5 mm the pixels each subtend an angular distance of $\sim 2 \times 10^{-3}$ radians. This angular resolution sets the minimum meaningful size for a watermarking feature. At a working distance for the game of 20 cm, the minimum spatial extent of a watermarking feature is $4 \times 10^{-2}$ cm. For robustness reasons, it may be advisable to over-sample the watermarking information leading to a larger watermarking feature.

Robustness

The watermark preferably withstands common image manipulations that result from holding the image in front of a camera, such as rotation, scaling, cropping, brightness adjustment and contrast enhancement. Detection is adaptive to camera-image distance. The watermarking technique works on small watermarked areas on the toy (say of size 1 inch by 1 inch). The watermark is detectable under conditions that include the soiling or distortion of the object to be presented to the camera. At a 15 fps rate the watermark detection is tolerant of image compression levels as high as a 50% reduction in file size. Since the digital watermark exists in printed form (on the toy or sticker), the watermarking technique is robust to D-A and A-D conversions.

Synchronization

Before the payload information can be extracted from the acquired image, the detector synchronizes the image with respect to rotation, scale and translation. The synchronization scheme is geared to recover affine transformations and small projective transformations. In particular, the payload is extractable from an image acquired at any angle of rotation about the camera's optic axis, for any distance within the focal zone of the camera, and with projective rotations of small pitch and yaw deviations from normality to the optic axis. A strong synchronization component may be necessary in the watermark signal, such as carrier signal or calibration signal that enables recovery from geometric distortion, or a watermark signal that is invariant to certain types of geometric distortions (e.g., rotationally symmetric patterns), as described in assignee's co-pending application Ser. No. 09/503,881 and U.S. Pat. No. 6,122,403, each incorporated by reference above.

Payload

Our preferred digital watermark payload includes plural-bit information. Based on toy, game or manufacturer requirements, our payload can even include various fields. In one implementation a payload includes three (3) fields—a toy ID that identifies the toy and the action, a manufacturer ID, and the intended minimum age. In this implementation, payload includes sufficient bits to carry the required fields. The payload size and importance of the individual fields determine the error correction scheme and the amount of spread employed. Some payload fields can have higher importance and could be encoded more robustly than the others.

In one implementation, the payload includes the following fields—toy ID (7 bits) that identifies the toy and the action, manufacturer ID (6 bits), intended minimum age (3 bits) and an open field (6 bits) for future use, giving a total of 22 bits. The payload size and importance of the individual fields determine the error correction scheme and the amount of spread employed. Some payload fields can have higher importance and could be encoded more robustly than the others. Here we assume all fields equally important. For fast detection, a simple repetition code (each bit repeated 14 times) can be used for error correction. Each coded bit is further coded into 30 chips to give a total of 9240 bits. To these we append 760 bits reference PN sequence derived from a key, to obtain a total of 10000 spread-spectrum bits. If the minimum camera resolvable feature has an extent of $4 \times 10-2$ cm the watermarked area should be of order 4 cm on a side for maximum robustness.

Table 1 shows a list of fields and the number of bits they include for another implementation. Here, we have introduced a field of 10 known bits and a field of 6 bits that is kept open for future use by extensions of this application. In all there are 32 payload bits. The term "ECC" in the table refers to error correction coding.

TABLE 1

| Field | Bits | ECC | Repetition |
| --- | --- | --- | --- |
| Toy ID | 7 | Yes | 4 times |
| Manufacturer ID | 6 | Yes | 4 times |
| Minimum age | 3 | Yes | 4 times |
| Known bits | 10 | Yes | 4 times |
| Open | 6 | Yes | 2 times |

False Positives

The known bits in the payload are used to achieve the desired false positive rate. The values of these bits are fixed for this application. During detection, the estimated known bits are matched with the known bits. A perfect match is often necessary for detection. This ensures that the false positive rate is 1 in $2^{10}$ (or less than 1 in $10^3$) for a randomly occurring bit pattern that matches the known bits. An additional factor of 1 in 100 false positives is achieved by including a classification decision at the synchronization stage. This decision involves a classifier that determines whether the acquired image is watermarked or not.

Error Detection and Correction

In one toy implementation, we assume that all the bits are equally important. Error correction may be achieved by means of error correction techniques such as BCH coding or convolutional coding. We select a rate ⅓ convolutional code as a compromise between efficiency of decoding and robustness of error correction. A similar calculation to that for false positives can be performed for the probability of a false read. That is, an object is held up and miss identified. The object should fail to read in preference to misreading. As an example let's say a level of one misread is permitted in 1000 hours of play and that one object is identified each second. (Very active play). This gives a misread probability of less than $1\times10^{\wedge}7$ For a given identifier payload size, this will determine the bits that must be allocated to error correction and the type of error correction codes to be employed.

To reduce false reads, we partition the chips for the coded bits of toy ID and manufacturer ID into two equal sets. These chips are despread independently and then decoded independently. A read is declared valid only when the decoded sets of ID fields from both sets match bit for bit.

Watermark Signal

A watermarked image I' is obtained by embedding the watermark W in the original image I, I'=ƒ(I, g(I,W)), where ƒ(.) is a function denoting the embedding operation, and g(.) is a gain function that depends upon W and local and global image properties. These functions can either be linear or non-linear. Embedding can be done either in a transform domain (e.g., frequency domain) or the spatial domain. The choice of the embedding domain also influences the amount of error correction and spread used. For the above-described toy application, we choose ƒ(.) to be an additive operation in the spatial domain. Though additive, the watermark may be computed as a non-linear function of the host signal and the embedded message to optimize imperceptibility and robustness of the signal. We could also choose to embed data using non-linear quantization embedding functions, where samples in the spatial or some transform domain are quantized to levels corresponding to symbols to be encoded.

The watermark signal W includes the spread spectrum bits combined with a synchronization signal, which can be a pattern robust to rotation/scale and/or carrier signal for the message payload. The spread spectrum bits can be designed to serve the dual purpose of a synchronization signal and message carrier by selecting a watermark carrier signal that forms a pattern in transform domain, such as a frequency domain or autocorrelation domain. The watermark signal is repeated in every M×N block of the image. A key determines the arrangement of the spread-spectrum and reference bits within the block.

In one implementation, the watermarked image is obtained by embedding the watermark signal, $$I'(x,y)=I(x,y)+\alpha(x,y)W(x,y),$$

where I' is the watermarked image, I is the original image, W is the watermark signal and α is the gain. The gain a is derived using HVS models, and depends on both local and global image characteristics as described in application Ser. No. 09/503,881 and U.S. Pat. No. 6,122,403. The watermark signal is of size M×N and is defined as $$W(x,y)=D(x,y)+S(x,y),$$

where D is the watermark component containing the spread spectrum payload and S is the watermark component comprising the synchronization signal. S is a known pattern, preferably with localization properties in the frequency domain. The use of a separate synchronization signal is optional. The spread spectrum payload can be designed such that it serves the dual purpose of a synchronization signal. For example, the properties of the carrier signal can be designed to create a pattern of signal peaks in the Fourier domain, the autocorrelation domain, or some other transform domain. Transforming the suspect signal to this domain and correlating the synchronization pattern with the transformed data achieve synchronization. Again, see application Ser. No. 09/503,881 and U.S. Pat. No. 6,122,403.

The spread spectrum payload can be broken down into its components $$D(x, y) = \sum_{i=1}^{q} C_i K_i(x, y).$$

Ci refers to the ith coded bit and Ki is a pseudorandom key signal used for spread spectrum coding of the coded bit Ci. The signal Ki serves two purposes—spread the coded payload and spatially scatter the chips so that they are not localized. The coded bits Ci are obtained from the payload bits Bi using error detection and correction coding, $$(C_1,C_2,\Lambda,Cq)=f(B_1,B_2,\Lambda,Bp), q \geq p,$$

where the function ƒ refers to error detection and correction.

The watermark W is repeatedly embedded in each M×N block of the image.

Detection

During detection, detector software reverses the steps taken during embedding. The detector has no knowledge of the original image. It obtains an estimate, Ŵ, of the watermark signal from the watermarked image. The detector applies prediction techniques to estimate the original image from the watermarked one. Ŵ is then obtained by comparing the predicted image with the watermarked image—it contains an estimate of the synchronization signal, an estimate of the spread spectrum payload and remnants of the cover image. The detector then uses Ŵ and a knowledge of the synchronization signal to recover the geometry (rotation, scale, etc.) of the watermark. A classifier at the synchronization stage discriminates the presence or absence of the synchronization signal. Before recovering the synchronization signal, the detector may apply pre-processing to suppress the unwanted components due to the image and the spread spectrum signal.

Using the recovered synchronization, the detector proceeds to extract the reference bits and spread-spectrum payload. The extracted spread-spectrum data is first de-spread and then decoded to obtain the payload bits. Again, at the payload extraction stage, the detector may pre-process $\hat{W}$ to further suppress components due to the image and the synchronization signal. In one implementation, the difference between the original and the predicted image is the prediction residual. The prediction residual is the estimate of the watermark signal. Let I" be the image presented to the detector. Then the estimated watermark signal is $\hat{W}(x, y)=I''(x, y)-g(I''(x, y))$ where g is a function representing the prediction operation. The estimated watermark $\hat{W}$ contains an estimate of the synchronization signal, $\hat{S}$, an estimate of the spread spectrum payload, $\hat{D}$, and remnants of the original cover image, $\hat{I}$.

$$\hat{W}(x,y)=\hat{S}(x,y)+\hat{D}(x,y)+\hat{I}(x,y)$$

The detector then uses $\hat{W}$ to recover the rotation, scale, and origin of the watermark. Note that both $\hat{D}$ and $\hat{I}$ act as noise during this process. Before recovering the synchronization signal, the detector may employ additional pre-processing to suppress the unwanted components $\hat{D}$ and $\hat{I}$. Using the recovered synchronization, the detector proceeds to recover the coded payload. An estimate of the coded payload bits Ci is obtained by a de-spread and de-scattering operation, $$\hat{C}_i = \langle \hat{W}(x,y), K_i(x,y) \rangle$$

Again, the estimated watermark signal can be pre-processed to suppress the components $\hat{W}$ and $\hat{I}$ before this step. Finally, the estimated coded payload is error corrected using the appropriate decoder to obtain the payload bits.

At each step during the detection process, a decision is made as to whether the recovered signal at that step is actually a watermark signal. The decision process at each step can be tuned to achieve specific false positive rates. This ensures that the overall false positive rate of the system can meet the required goal.

The operating point of the classifier at the synchronization stage is derived from ROC curves that ensure a false positive rate of 1 in $10^2$. We then estimate the reference bits and correlate with the reference sequence. The correlation threshold is chosen to give a false positive rate of less than 1 in $10^3$, to give an overall false positive rate of 1 in $10^5$.

To reduce false reads, the detector partitions the chips for the coded payload bits into two equal sets. These chips are de-spread and decoded independently. A read is declared valid only when the decoded sets of ID fields from both sets match bit for bit. Assuming that the probability of chip error is 0.4, this gives an approximate false read rate of less than 1 in $10^{-4}$.

Detection Speed

Our assumed requirements suggest that when the capture device is a camera, the frame-rate should be at least 10 fps when no watermarked object is held up to the camera. At this desired frame-rate the detector gets a maximum of 100 ms to reject a frame that does not contain a watermark. When the frame contains a watermark, the detector can take up to 200 ms to read the watermark, based on the 5 fps requirement. These bounds imply that a fast decision must be made about the presence or absence of the watermark. When a watermark is present, more time is available Back End and Internet Connectivity Considerations In one implementation of our present invention, a game or toy is playable using a stored video clip that is packaged and initially sold or distributed with the toy or game. Internet connectivity is not required in such a case. Should it be available, however, the utility of the game is enhanced by allowing connection to the internet for the download of additional sound and video clips, for registration of the toy or game, and for an update of game or watermark detection software. For a description of indexing information or programmatic actions from a digital watermark, see U.S. Pat. No. 6,122,403 and application Ser. No. 09/571,422.

L. Enhancing and Modifying Games with Digital Watermarks

As noted previously, the above game system can be adapted to a variety of toy and game applications. Some example categories of game applications include:

1. Card Games;
2. Interactive or automated books;
3. Collectible and Role-playing games;
4. Multi-player games; e.g., games over a computer network such as the Internet;
5. Toy component recognizers;
6. Puzzles;
7. Scavenger hunts; and
8. Game devices and consoles (e.g., Gameboy, Xbox™, PlayStation 2™, GameCube™, etc.).

Card Games

Some examples of card games include flash cards for learning math or reading, or playing cards. For flash cards, the user shows the digitally watermarked flash card to the PC camera, which captures a digital image of the card and passes it to a computer. The computer, executing watermark decoder software, extracts a watermark identifier (or payload) identifying the card and plays audio and/or video helping a child solve a math problem, or helping the child spell or read a word on the card.

In a playing card game, at least one side of each card is digitally watermarked identifying the type of card (such as the suit and card type—King through Ace). The player shows the card being played to the computer, which in turn, extracts the type of the card, and makes a play based on that card. The computer is programmed to play any of a variety of card games, like poker, black jack, bridge, etc.

Interactive or Automated Books

Similar functionally can be achieved with read aloud or interactive books as discussed in parent application Ser. Nos. 09/709,255, 09/571,422 and 60/151,586. For example, digitally watermarked images of a book or magazine can be shown to a PC camera connected to a PC that executes a game application. In one scenario, the PC displays a virtual environment with an animated character. A child interacts with the character and the game by showing pages of the book to the PC camera, which in turn transfers the captured image to a watermark decoder executing in the PC. The watermark decoder decodes the watermark ID and looks up a corresponding action in a database, either local or on the Internet. For example, the child can use pictures of clothing items to dress the character based on the environment in the scene. The database tracks a game state, the pages presented to the PC camera and plays a response, e.g., animation dressing the character, in response to the decoded watermark ID and game state.

Collectible and Role-Playing Games

Examples of collectible games include collectible trading cards or objects like Dungeons and Dragons (or other role playing games) or Pokemon cards. Each of the collectibles is digitally watermarked with a message (or payload) conveying the type of card. During game play, the user shows the item to the PC camera, which passes image data corresponding to the item to the watermark decoder software executing as part of, or in cooperation with, the game software. The digital watermark decoder enhances game play by enabling the player to confirm that he or she has special cards that alter the attributes of the player's persona or character in the game scenario. By presenting the card, the user's persona within the game scenario takes on special powers or behaviors associated with that card via the digital watermark. The game may even track how many times the player presents the card during a game session so that the attributes granted to the player's character change over the session depending on the number of times that the player has presented the card.

Multiplayer Games

Such interactive game play with computers can be extended to multi-player games like Everquest, which are played over computer networks. In one such multi-player game, each player has computer software executing on his or her computer that seeks input from the player and displays output, in addition to connecting each player to a computer (e.g., game server) that controls the game session. These computers may be interconnected over the internet or some other network that enhances the speed of game play through a fast network connection. As in the collectibles game, the digital watermarked game objects enable the user to enhance his character's attributes by presenting objects to the game via the PC camera and watermark decoder as described above.

For example, a first game player is playing an on-line, multi-player fantasy game under the persona (or character) of ZOTE. ZOTE's resources and strength have been significantly depleted in a vicious struggle with ZEPHER. ZOTE is in desperate trouble. Luckily, the first player has a digitally watermarked energy card. The first player presents the energy card to her web camera. A digital watermark detector decodes the digital watermark from an image captured by the web camera to obtain a watermark payload. The payload conveys (or points to) information corresponding to extra energy (and perhaps additional strengths, resources, tools, weapons, abilities, powers, etc.) that the game software uses to update or enhance the once-haggard ZOTE.

In addition to embedding a message that indexes a particular character attribute in a database, the watermark message may also include an ID that is uniquely associated with a game player. In one implementation, the user registers game pieces in her possession by showing the game pieces to her PC camera during an introductory (or updating) session of the game. The game software accesses a registration database on the Internet via a web-based interface. The game software extracts the card's (or game piece's) unique ID and sends it to the registration web site, which in turn, prompts the user to provide information about herself, such as a character name. The registration database then associates the unique ID with the player or player's character. Then, during game sessions, the game server accesses the registration database to determine the name and possibly character attributes of the player based on the unique ID read from the game object presented to the PC camera during a game session. This system enables a game session to tailor game-play based on attributes of the user, possibly stored from previous game sessions. For example, if a game character is known to have certain strengths or weaknesses in previous game sessions, the game server stores this information so that it is associated with the watermark ID or IDs assigned to the character. Then, the next time the user shows objects bearing these watermark IDs, the game server looks up the character's attributes and incorporates them into the current game session.

Toy Component Recognizers

Another category of games enabled by this system is a toy component recognizer. In this type of game, a digital watermark on the toy enables the game software to recognize and distinguish toy components. The toy application described earlier, where the game plays audio or video associated with toy components, is an example. Other examples include toy dolls, robots, animals, etc. that include or communicate with camera sensors for reading watermarked objects. For example, a toy dog can be shown a watermarked bone that carries a watermark message to trigger a behavior in the dog, like wagging its tail or barking. A toy robot or remote controlled vehicle can be programmed to move in different directions in response to control messages embedded in toy structures, cards or blocks. For example, a child builds a path through a collection of block structures (like LEGOS brand blocks) marked with digital watermarks. The robot then reads the blocks and determines which way to move based on the directional control embedded in the digital watermark on the surface of the block.

Puzzles and Board Games

Puzzles are another category of games that can be enhanced with digital watermarks. One type of puzzle enhanced by digital watermarks includes a number of pieces each digitally watermarked with an identifier of the puzzle piece. To solve the puzzle, the pieces are assembled in a predetermined arrangement. While assembling the puzzle, the player shows a puzzle piece to a PC camera, which transfers a captured image of the piece to watermark decoding software executing in the computer. The watermark decoder extracts the piece ID and uses it to look up information about the piece, including, for example, a clue about how to assemble the piece with other pieces, or additional information necessary to assemble the puzzle. Or the player must construct the puzzle by arranging the piece as shown on the computer monitor. This interactive puzzle system enables the computer program to change the manner in which the puzzle is assembled over time to make the puzzle dynamic and challenging. It also provides a way to make the puzzle easier to solve for novice players having trouble arriving at the solution.

Another alternative is to embed digital watermarks across puzzle pieces so that the computer can verify that it has been assembled correctly. For example, the digital watermark may be embedded so that it is unreadable unless the pieces are assembled in a manner that a digital watermark can be read from an image of the assembled pieces. One way to do this is to embed a watermark in an image block that spans a boundary between two or more pieces. If the entire block is not captured in the image of the completed puzzle, the watermark reader will not make a successful read. As another example, the digital watermarks carried in individual pieces can carry unique IDs. The watermark decoder then determines whether the unique IDs extracted from an image captured of the completed puzzle are located in the proper locations relative to each other in the captured image.

A further extension is to use a digitally watermarked puzzle or game board in conjunction with the digitally watermarked puzzle or game pieces. The user can then hold the camera up to parts of the puzzle or game board to get instructions about how to solve the puzzle or play the game at that location on the board. In particular, image blocks on the board are digitally watermarked with unique IDs. The user holds the camera up to a particular board location and captures an image of that location from which the game software decodes the unique ID. The software then looks up the associated clue or game instruction for that location and displays it on the computer monitor or plays it as audio output. This approach can make traditional board games like Monopoly and Clue much more dynamic by having the board locations and game pieces carry watermarks that instruct the computer to perform a related action, such as play a video or play music, etc. If game pieces and board locations are shown to the computer, the computer can keep track of the game state, including number of players, their names, position on the board. This enables the computer to play along and play audio and video that is pertinent to the game state. For example, in a monopoly game, the computer can keep track of properties on various board locations so that when the user displays a property card to the computer, it displays the amount of rent and automatically decrements it from a player's account.

In the above examples, each of the digitally watermarked components and game boards that carry digitally watermarked images may carry them in an image imprinted on the object, in a surface texture (e.g., surface micro-topology laser engraved on the object), or in display device (such as CRT, LCD, etc. display device). For example, objects displayed in interactive video games, and multi-player games, can carry digital watermark information. To read the digital watermark, the user can hold up a PC camera, capture an image, and execute watermark decoder software on the captured image. Optionally, the digital watermark can be read from the digital image rendered to the screen that resides in the video memory of the device or computer.

As an added enhancement to the game and puzzle boards described above, the game boards may include a processor and wireless connectivity devices (e.g., infrared or Bluetooth) that enable the game boards to be updated with new game and puzzle programs when they are within a particular distance of a computer from which the programs can be transmitted over a wireless connection. This enables the game board to be played freely without being connected, but also updated when in the presence of a computer having new game programs.

In each of the above applications, the digital camera can be either a tethered or wireless camera connected to the computer that executes the game software and watermark decoder. (Of course wireless cameras provide a number of advantages for the game board applications because they enable the user to hold the camera up to the game board more easily than a tethered camera.).

Further, the game software can include a watermark embedder that enables the game player to create customized game pieces with customizable behaviors. To assign a behavior with an object, the game application connects with a registration database (e.g., via a web interface on the internet) that enables the user to specify game behaviors or actions to be associated with a particular watermark ID. The embedder then embeds the ID into an image to be printed on a sticker, label, etc. and shared with other game players and used in game play.

Scavenger Hunts, Etc.

Traditional scavenger hunts and navigational contests can be improved with digitally watermarking. Consider a hunt in which contestants must find clues, the clues being digitally watermarked. A digital watermark carries a hint of where to find the next clue or location. Or the digital watermark can verify that a clue was found (e.g., by capturing a picture of a digitally watermarked item, storing the item, and then presenting the captured image for later verification through decoding the digital watermark). A scavenger hunt can even be held on-line. Contestants surf the web looking for clues, the clues being digitally watermarked. Or an advertiser can host a contest with prizes being awarded to the contestant who successful previews predetermined advertisements (the tracking, of course, being monitored with digital watermarking, or clues to the next ad being provided with digital watermarks).

Users can trade information about digitally watermarked images by displaying the image on their display screen, capturing the displayed image via a separate camera device, and then decoding the digital watermark embedded into the captured image on the separate device. One user scenario is hand held computers equipped with displays and digital cameras. The image displayed on one hand held device is captured by the camera of the other hand held device. The second handheld device then decodes the digital watermark embedded in the captured image and uses the ID embedded in the watermark message payload to look up related information, such as a pristine digital copy of the image, information about the objects depicted in the image, etc. This same process could be applied to audio watermarks with hand held computers having audio input/output capability.

This technology provides a foundation for a variety of applications, including games and toys, as well as business applications. For example, users can trade electronic trading cards by showing a digitally watermarked trading card displayed on one computer to a camera connected to another computer. The second computer extracts the digital watermark, including ID, and uses the ID to fetch a copy of the electronic trading card from a database (e.g., via wireless connection). Similarly, users can trade digitally watermarked music. One device plays a music clip. The second device captures the audio via a microphone, extracts the digital watermark, including ID, and sends the ID to a database via a wire or wireless connection. The database looks up the song using the ID and then returns a file of the song to the user's device or to an on-line library associated with the user on the Internet for later downloading.

This application can be extended to electronic business cards and promotional materials to enable sharing images of these materials between devices. An alternative delivery mechanism is to send the digitally watermarked image electronically through a wireless connection from one computer to one or more receiving devices. The receiving device can then decode the digital watermark from the digital image, or alternatively display it before a digital camera, which in turn, captures an image and passes it to a watermark decoder for extraction of the ID and execution of a behavior associated with that ID.

Consider the following application. Person A goes to a trade show and meets Person B. Person B has a computer or server that transmits electronic business cards to Personal Digital Assistance via a wireless connection. Person A receives the electronic business card on his PDA and later, while at his computer workstation, displays the electronic business card on his PDA to a digital video camera attached to his workstation. Digital watermark decoder software on the workstation extracts the digital watermark, including ID, and sends the ID to a database. The database returns information, such as person B's contact and company information, to the workstation computer. The workstation computer then automatically updates Person A's contact database with the returned information about Person B. The returned information can also include product brochures that can be displayed on the workstation, such as an HTML page with links to additional related information on the Internet.

Game Devices and Consoles

Figure 2:
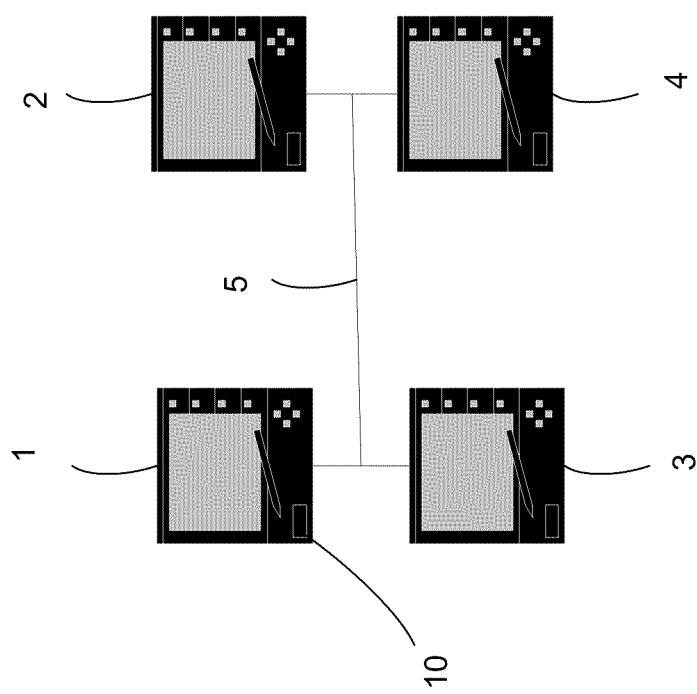
FIG. 2 is a block diagram illustrating a multi-player computer game environment.

Now consider a personal gaming device, such as Game Boy Advanced™ provided by Nintendo. The Game Boy Advance, for example, has a 32-bit ARM processor, as well as memory and bus structure. Typically, game cartridges or packs communicate with the gaming device to provide the necessary software instructions to support a particular game. In other gaming environments, game software instructions are stored in RAM or ROM, or on computer readable media, such as magnetic, optical, or magnetic-optical media, etc. (Of course, other gaming devices are well known, which can be suitably interchanged with the present invention. Even personal computing units, such as those described in assignee's U.S. patent Ser. No. 09/842,282, can be used as gaming devices. Cell phones and personal digital assistants are also capable of supporting computer games. There are many other game platforms for home use, such as those manufactured by Sony, Nintendo, etc. The inventive aspects of the present invention applies to these game platforms as well.). Often, a plurality of gaming devices is interconnected to facilitate multi-player gaming scenarios. With reference to FIG. 2, four devices 1, 2, 3 and 4 communicate via a device link 5. The link 5 may be provided by cables, or via a wireless connection (e.g., IR, RF, laser, etc.). When linked to play the same, multi-player game, the devices 1, 2, 3 and 4 may rely on a single game pack (or other software medium), or may require multiple game packs to play the multi-player game. It is often possible to download game software instructions or information from one device into interconnected gaming devices.

At least one of the interconnected gaming devices 1 preferably includes (or communicates with) an input capture device 10. Input device 10 may include a digital camera, video capture device, web cam, scanner, optical sensor, and/or a digital eye module (such as those provided by LightSurf, Inc., etc.), etc. Input device 10 alternatively includes a complete camera on a chip, CMOS imaging sensor, and/or a miniaturized lens and imaging software. Other possible imaging devices include a CCD image sensor. Of course, each of the other gaming devices 2, 3 and 4 may optionally include such an input device. Input device 10 provides image data (sometimes referred to as "scan data").

Gaming device 1 preferably executes digital watermarking decoding software instructions. The decoding software instructions may be included in a game pack, cartridge, or other computer readable media. Alternatively, the decoding instructions reside locally in the gaming device 1 memory (e.g., ROM or RAM) or in other electronic memory circuitry or media. Of course, each of the other gaming devices 2, 3 and 4 may optionally include digital watermarking decoding software.

There are many possible gaming applications with such a gaming device 1. Consider the following illustrative examples. Interconnected gaming devices 1, 2, 3 and 4 are playing a multi-player game including different characters. The gaming devices may interact with physical objects, such as cards, stickers, product packaging, certificates, comic books, documents, emblems, game pieces, game cards, coupons, etc., etc. Such interaction is facilitated by a digital watermark embedded within the physical object. Input device 10 captures an image or optical scan data from the physical object. The image or data is analyzed by the digital watermark decoding software to detect and decode the digital watermark in the scan data. Preferably, the watermark includes a payload or message. The payload provides a variety of information, which can be used by the game software to change or enhance the game environment, characters, game story form, abilities, levels, etc.

Take a digitally watermarked character card. The card preferably represents a character available in the multi-player game. The digital watermark payload includes plural-bit data, which unique identifies (or points to a memory address with data that identifies) the respective character. The payload may optionally include additional information, such as plural-bit data representing character strength, ability, available tools, weapons and/or ammunition, spells, powers, martial arts techniques or moves, characteristics, available resources, energy, food supplies, etc., etc.

The input device 10 captures an image of the card. The decoding software analyzes the captured data to decode the digital watermark. The payload is recovered, and the game software uses the payload information to add the respective character to the game, or the abilities of the character are enhanced according to the payload information. Perhaps the operator of gaming device 1 flashes a character card to input device 10 to interchange a character's abilities or resource inventory. The game software uses the watermark information (or information pointed to by the watermark information) to enhance or modify the game. (Our definition of the term "modify" should be broadly construed in this document. "Modify" may imply that the game software interacts with the watermark information, or that the game software uses the watermark information to provide a new, enhanced or additional gaming experience. "Modify" may also imply that the game software interacts with the watermark information to provide game options in a manner only achievable with the watermark information. Of course, the term "modify" can also have its familiar meaning of changing or altering the game experience as well. Or "modify" can mean that game software uses the information to alter a game scenario or operation, etc.). Or perhaps when faced by a particular opponent, the operator sorts through her collection of character cards to find a suitable adversary. The operator may also have a card, or set of cards, which include watermark payload information to power-up, refresh a character's energy level, or give character-saving life.

Game manufactures (or others associated with the game) may sell or supply digitally watermarked cards, which are suitable for a particular game. In one embodiment, a watermark payload protocol is established such that new characters can be introduced into a game after the game's initial release. In this implementation the watermark payload preferably includes plural-bit data, which interacts with predefined game library or character data set. The payload information identifies which attributes from the character library are to be composited to make a new character. In this implementation, it is even possible to have a game operator create her own characters, such as through an on-line or kiosk-environment, PC, or internet-base system. Once a character is created, developed and/or trained online, a corresponding payload is determined. The payload reflects (or points to) the desired or trained attributes (e.g., strength, physical attributes, weapon or skill knowledge, powers, gender and species, etc.). A card is printed to include the new payload. The card is then used in the personal gaming environment. Once the payload information is decoded, the game's software instructions create the corresponding character according to the information provided in the payload information. A new character is born. Similar techniques can be used to alter a game's environment (background, cities, terrain, climate, settings, etc.) or story line (e.g., the watermark may trigger the execution of a predetermined block of software code, etc.).

Now consider the Pokemon example given above. Operators of interconnected gaming devices select various Pokemon cards from a personal collection to introduce to the game. Input devices capture the character cards. Digital watermarks are identified and decoded from the captured data. As discussed above, the watermark payload can identify character identity (or characteristics) for the respective character cards. The multi-player game experienced is accordingly enhanced.

It should be appreciated that while FIG. 2 illustrates four interconnected gaming devices, the present invention is not so limited. Indeed, only two such devices can be interconnected, while many more devices may be added to the multiplayer game environment, depending on game and device specification. Moreover, a gaming device operating a single player game (or operating in a single player mode) may still enhance game play through digitally watermarked objects. The inventive aspect detailed above regarding creating, modifying attributes or training new characters can be used in single player environments, including home game consoles and personal PCs, as well.

Of course the above game implementations can be carried out on game consoles like a Microsoft Xbox™, Sony PlayStation 2™ and Nintendo GameCube™ (or the like).

Today's game consoles are sophisticated, including state-of-the-art computer processors, graphics, communication buses and memory. (The term memory is broad enough to encompass both system memory such as RAM, ROM and data caches, and storage such hard drives, etc.). A game console memory can include software instructions (e.g., a device driver) to control an input device. The input device (e.g., a digital camera, 2-D bar code reader, scanner or web cam) communicates with the game console through a communications port. The input device is preferably tethered to the game console via the communications port, or wirelessly communicates with the game console via the port. (In an alternative embodiment, the input device communicates with the game console via a network connection.). A game console typically includes a game media drive (e.g., a CD-ROM drive or DVD player, etc.).

A game console memory includes digital watermark decoding software to detect and decode a digital watermark. (In another embodiment, a game CD or DVD includes digital watermark decoding software.).

A digitally watermarked card (e.g., a game or character card, character paraphernalia, character or sports trading card, product packaging, physical object, etc.) is presented to the input device. The input device captures an image of the card and communicates such to the game console. The digital watermark detecting software, executing on a game console processor, detects and decodes the digital watermark from the captured image. The watermark includes a payload or other message. The payload preferably carries game-enhancing information (e.g., relating to character strength, weapon type, power, sports character, etc., etc.), or the payload includes an index to access a data record including the game-enhancing information. Game software used the game-enhancing information to enhance or modify a game. A data record is stored locally in the game console (e.g., RAM, hard drive or even in the game media itself). In another implementation, the data record is remotely stored, e.g., and accessible via the internet or other network. The game console (or more precisely, software executing on a processor of the game console) incorporates the game-enhancing information into the game.

For example, the game-enhancing information may provide a game character, oh let suppose in a futurist version of Xbox Halo™, with a new weapon or extra body armor. Or the game enhancing information may provide extra powers or clues in futuristic versions of Nintendo's Legend of Zelda™. (Of course, other game titles and platforms—and even future game titles and platforms—can include software instructions to cooperate with the game-enhancing information, as carried by or accessed with a digital watermark.). In one implementation, the game-enhancing information includes a code to unlock a restricted portion of the game software. In another implementation, the game-information provides a key or information to allow access to a hidden or restricted game level or to enhance game options. In other implementations the game-information provides data used by game software to modify character attributes or to composite characters based on predetermined libraries.

Consider the following inventive features: game-enhancing information provides information for the introduction of new characters, character enhancements, new weapons or supplies, maps or game clues, access to a hidden or restricted game level, plot twists or introduction of sub-plots, new spacecraft or transportation vehicles, powers and spells, food, sport characters and athletic abilities, etc., etc., etc.

In one implementation, a game console provides internet access or the game console communicates with a PC to gain internet access. (Today's game consoles include sophisticated hardware and software capable of supporting internet access and navigation.). In one implementation, a game console includes an internet browser, or the internet browser is included as part of a game's software. A digitally watermarked card is used to access an online game, e.g., with the techniques discussed in parent application Ser. No. 09/571, 422. For example, the digital watermark includes a URL to direct the internet browser. Or, upon watermark detection, the browser defaults to a website (or online database) and the digital watermark includes an index. The index is used to interrogate the website/database to access a URL.

Regardless of the implementation, the URL may provide access to a restricted or exclusive online gaming environment, e.g., to be played via the game console. Or the URL may allow access to an exclusive online gaming chat-room.

The URL may be used to access game secrets or to provide the user with promotional information or advertisements.

In another implementation, the URL provides access to a trailer or beta preview of a new game. The preview can be downloaded to a game console (or to a PC with a CD-burner for use on the game console). The preview can include an identifier that is uniquely associated with the digital watermark. In order to play the preview game, the user must first present the digitally watermarked card. If the digitally watermarked card and the preview identifier match or otherwise relate access is granted. Otherwise access is denied.

In another implementation, a digitally watermarked card (e.g., a character card) provides access to a character-building website. The website helps the user design her own character. Or a standard character is trained at the website to obtain additional attributes. Or the website allows the user to select desired character (or game persona) attributes and powers to enhance her game. Once constructed, trained or selected, the personalized game character is provided to the user. In an online environment, the personalized game character or attributes can be maintained in a central or distributed database. This is advantageous since if the card is traded the characteristics remain accessible. The character can be updated as well. For example, if the personalized game character engages in a battle, and loses strength or depletes her arsenal, such battle results are reflected by updating the central or distributed database.

In a home gaming environment, the personalized information can be directly downloaded for use with the game console. Or the information is into a new game card (or game CD) for the user. In this implementation, the embedded information may be used by the game software to select from a number of predetermined attributes already stored in the game (e.g., in tables, libraries or blocks of code). The game then composites the new character or adds the new characteristics (e.g., in a simplistic example, a watermark payload includes data bits to indicate that a new character has a level 5 strength, sniper rifle, body armor and green uniform.). The new digitally watermarked card can be e-mailed to the gamer for home printing. The e-mail may include a digitally watermarked graphic that can be printed and presented to the gamer's input device. Or the card is otherwise posted or faxed to the user.

In another implementation, a digitally watermarked card comprises at least one of the following:

Benefits Card—a card that provides extra hints, clothing, meals, maps and/or weapons to help with game;

Exclusive Card—a card that provides exclusive game rights or options, including accessing a new or restricted access level or access to game updates, or even gifting powers or attributes to a friend;

Random Card—a card that provides benefits or problems depending upon card, time and day, game conditions, game level, etc.;

Data Port Card—a card used to introduce a game persona within a game; and

Power Trading Card—a card that links to or defines a game persona or character.

In yet another implementation, a digitally watermarked card includes a static, robust watermark. (A robust watermark will typically survive signal processing, including scanning and reprinting, compression, etc.). The robust watermark preferably includes static information to identify the card or characteristics. This information is non-personalized, and static, meaning that a batch of, oh say 100,000 cards, is run so that each card includes the same embedded information. Information corresponding to a game console is used to augment the static information. (E.g., the game media or console's serial number can be used to augment the data. The card ID and the game/console ID are then concatenated to form a personalized ID.). This is an advantageous approach to track and distinguish the many game characters and/or central training of such characters. (For example, consider a game manufacturer who hosts a website "training camp." The personalized ID is used to track and monitor character card training.).

In still another implementation, the digitally watermarked card includes a so-called fragile watermark to help prevent copying. A fragile watermark is lost or degrades predictably upon signal processing like scanning and printing, some compression, etc.

Digitally watermarked cards optionally are used at central kiosks or video arcades to access game-related websites. A young gamer, forced by mom to go shopping at the mall, may find such a kiosk and continue character training while mom finishes up her shopping. Or the gamer may peruse upcoming new releases, or access other promotionals, via the card. (The digitally watermarked card is presented to the kiosk to facilitate internet navigation as discussed above.). Of course, we anticipate that game consoles will evolve as they have done so over the years. Our inventive techniques will equally enhance the game experience and player interactivity with future console improvements.

Orientation-Based Game Input

In parent application Ser. No. 09/571,422 and PCT/US01/14014 (published as WO 01/84438) we disclose how a watermark orientation component can be used to determine an object's rotation, translation, relative X-Y offset and scale.

The orientation or positional determinations can be used as game input. Consider using watermark rotation input in an interactive or computer game. To illustrate, a gamer wears a digitally watermarked glove (or holds a watermarked object or document) and moves or rotates the glove to "virtually" interact with a game. Images of the glove are optically captured, and the images are analyzed to detect the watermark orientation component. The determined (or relative) orientation of the glove is used as input for a game. The game software uses this orientation input in much the same fashion as it uses joystick or keyboard input. The game software can provide corresponding movements (or feedback) to the gamer via a computer display (or TV). The game software uses rotation and/or scale values determined from the glove (and compliant watermark reader) to provide an interactive gaming experience. The gamer may virtually open a door, unlock a safe, throw a punch, or pull a secret lever, etc. with such techniques.

Dynamic Applications

Figure 3:
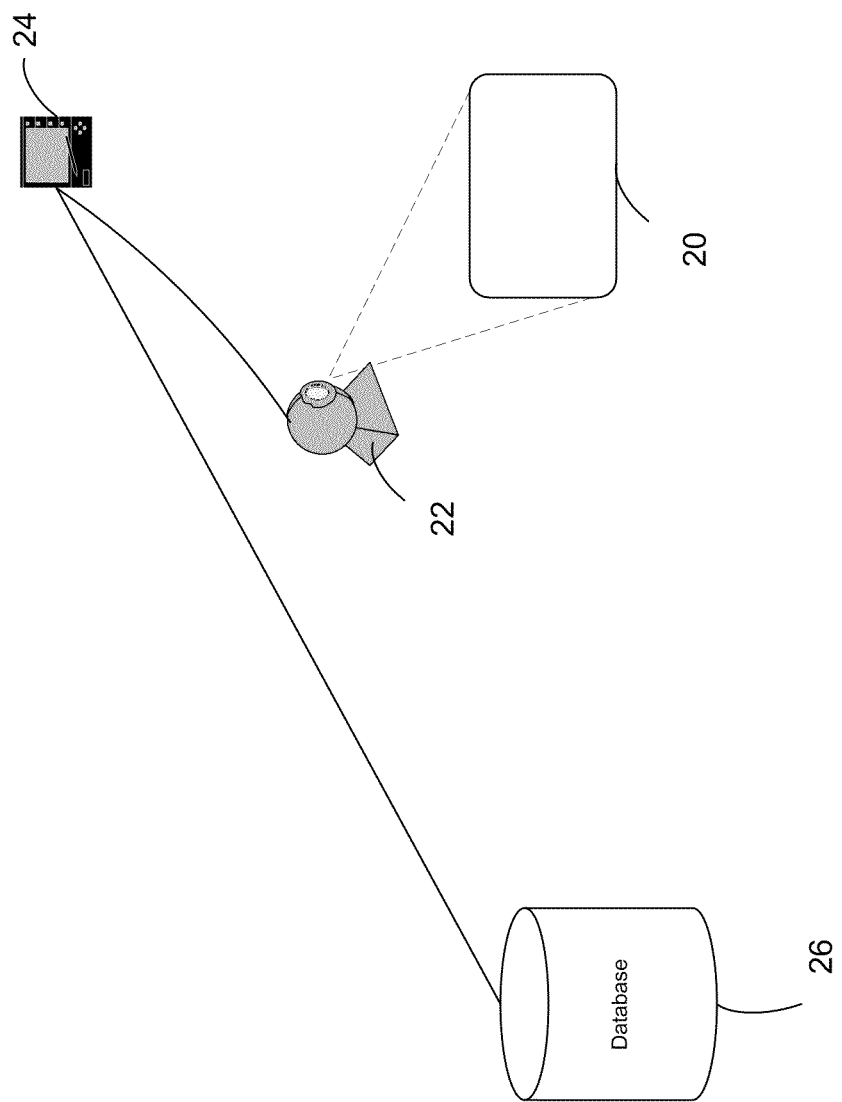
FIG. 3 is a block diagram illustrating a data retrieval according to one aspect of the present invention.

Another aspect of the present invention is described with reference to FIG. 3. In the FIG. 3 embodiment, an embedded digital watermark serves as (or cooperates with) a unique information carrier. A digital watermark includes at least one unique identifier. The unique identifier is used to associate related information. For example, related information can be stored in a database (or other data storage structure). The related data is categorized according to the unique identifier. The database data is dynamic, in that its data entries can be changed or updated.

Figure 4:
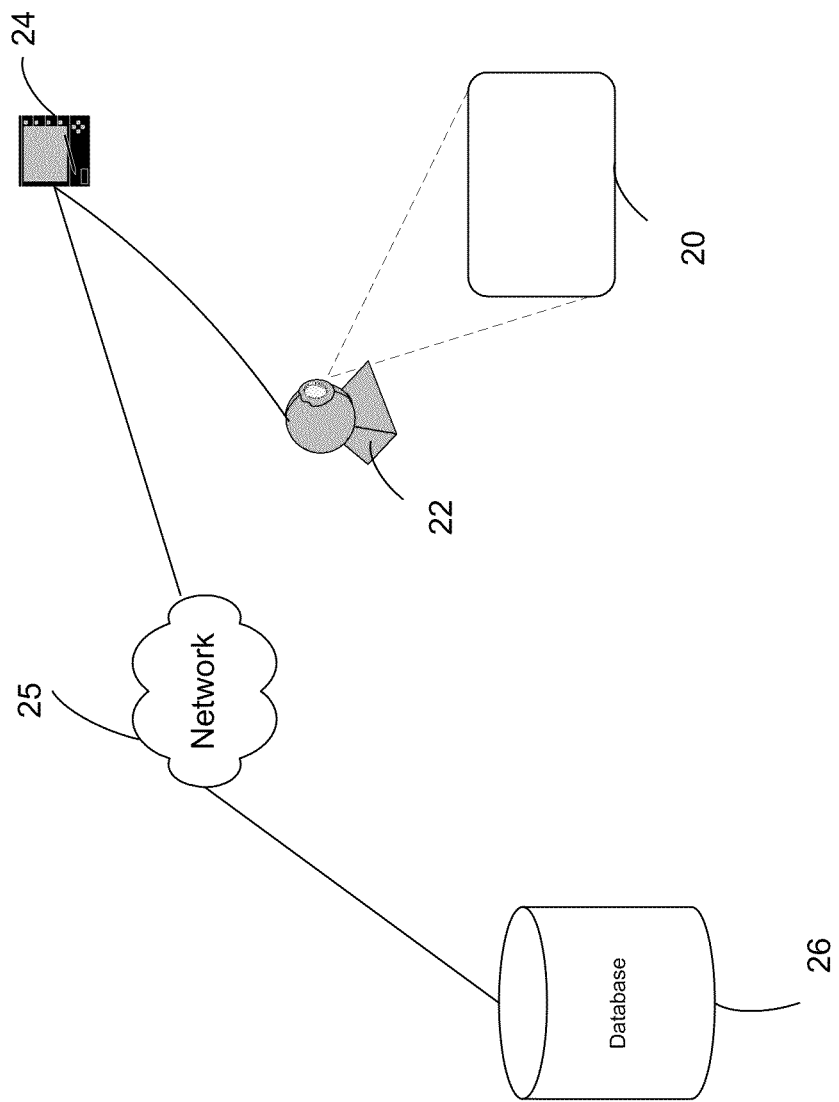
FIG. 4 is a block diagram illustrating an alternative communications path of the FIG. 3 embodiment.

Returning to FIG. 3, a physical object 20 is embedded with a digital watermark, including a unique identifier. The unique identifier preferably includes plural-bit data. An input device 22 (or image capture device) captures optical data or an image of the physical object 20. The image or data is communicated to a suitable computing device 24, such as the devices discussed above. The computing device 24 (in cooperation with software executing on device 24) decodes the digital watermark to recover the unique identifier. Watermark decoding software may be stored locally on the device 24, or may be incorporated into a software game application running on device 24. Alternatively, a software or computer game program executing on device 24 may call a decoding module stored on device 24 (or accessed remotely) to facilitate decoding. The game program can be for single play, or for multiplayer via a networked or online interactive environment. Once decoded, the unique identifier is used to interrogate database 26. Of course, database 26 may be local or remotely located with respect to computing device 24. The database 26 may also be integral with respect to computing device 24. Alternatively, as shown in FIG. 4, computing device communicates with database 26 via a network 25, such as the internet, intranet, LAN, WAN, wireless network, etc. Information associated with the unique identifier can be retrieved, updated or otherwise modified. Retrieved information can be used by the game executing on device 24. For example, the data is input to the game (or otherwise used by the game's software instructions) to modify or enhance the game.

Now consider a gaming application. A character card is digitally watermarked to include a unique identifier. The unique identifier is associated with a certain aspects or attributes of the respective game, such as characters, magic powers, clues, species, gender, surroundings, names, spells, power, life, gender, environment, character characteristics, tools and resources, energy, life expectancy, and/or other attributes. The character attributes are stored in a database to be indexed via the respective unique identifier. (Note that such a character card can be produced or sold with a "base" level of attributes. In this base-level implementation, these attributes are stored in the database 26 to be available to a gamer during his first play.). A gamer presents the character card to the input device 22. A captured image is analyzed by watermark decoding software executing on device 24. A decoded unique identifier is communicated to database 26 to index the corresponding attributes and/or character. The corresponding attributes and/or character information is communicated to device 24. The game software incorporates the retrieved information and attributes into the game. For example, the game incorporates the retrieved attributes into the character's profile or attribute library/list.

In one implementation, the attributes and characteristics are dynamic and can be changed to reflect game activity or events. A "resource" card, in which energy, life, food, power, ability, resources, strength, etc. are enhanced, can be depleted or refreshed during the game. Suppose a game character crosses a desert, but has a "water" card. The water card can be depleted each time the gamer shows the water card to the input device. The water card may be refreshed if the character stumbles onto an oasis. Or a character attribute card may be presented to face certain challenges during a game. Or for electronic versions of popular board games, a card can be used to get a player out of jail, roll the dice, answer a question, make a murder accusation, move a game piece, etc., etc. (From a system perspective, a database, library or memory cache can receive updates reflecting new or modified data resulting from game activity. Alternatively, the database itself can regulate the data, e.g., by increment or decrement counters or values corresponding to certain game attributes (e.g., life, power, level, uses, etc.) upon use or refresh, or based on time-sensitive requirements, which expire after a certain amount of time, inactivity, or failure to achieve game objectives.).

Figure 5:
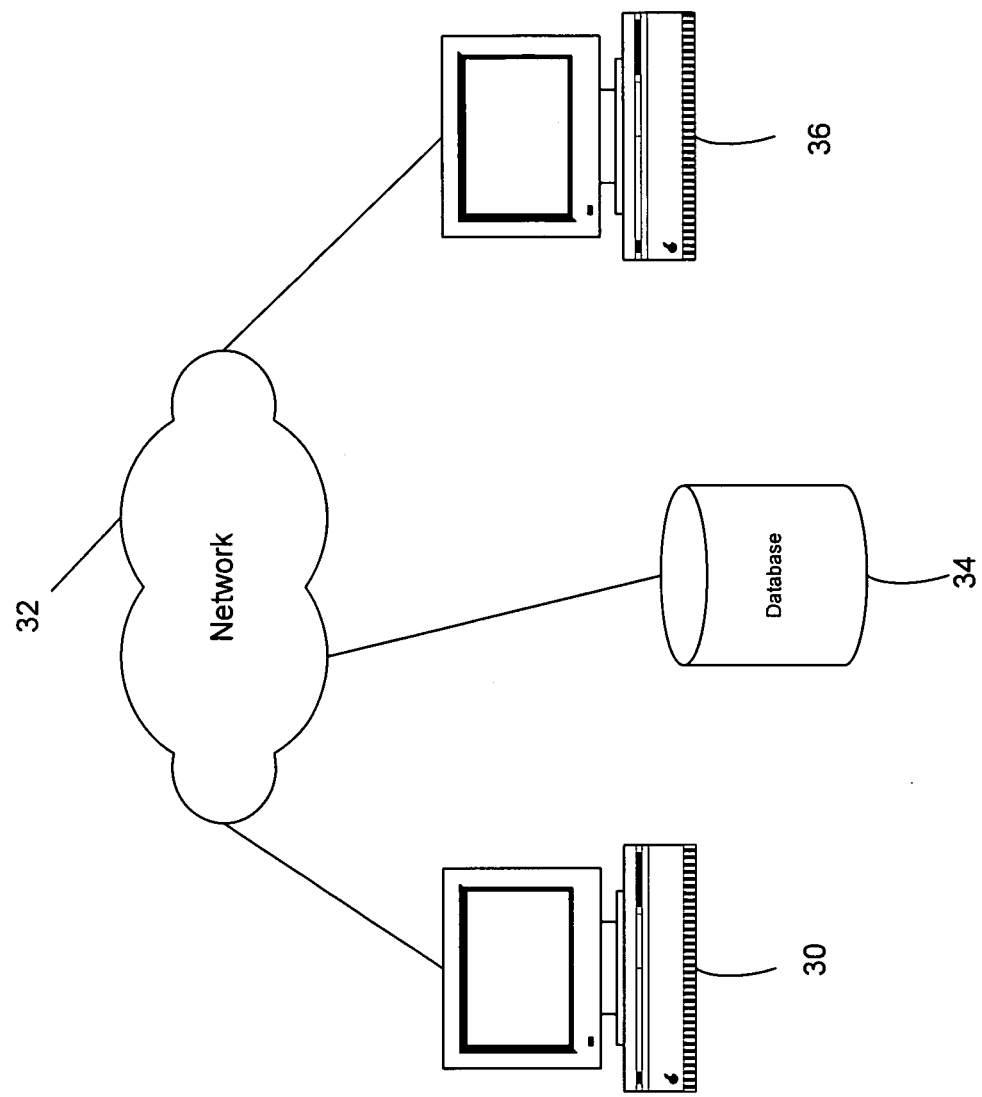
FIG. 5 is a diagram of an interactive game environment.

Such inventive techniques provide a dynamic and interactive gaming environment. Consider a multi-player application (e.g., such as shown in FIG. 5) for a fantasy or adventure like game. A first game player (at terminal 30) has a card corresponding to a wizard. A second game player (at terminal 36) has a card corresponding to a witch. The respective game develops so that the wizard and witch do battle. The first and second players present their respective cards to an input device, or to respective input devices. Watermarks are decoded and the respective wizard and witch attributes are determined from the database 34. The corresponding attributes are used by the game software (or as in one embodiment, a collaborative software game environment) to shape or determine the outcome of the confrontation between the game characters.

As an illustrative example, suppose the wizard card has power level 12 and includes a spell to "melt a witch." The first player flashes the wizard card to her input device, while the second player flashes her witch card to her camera. The witch card has a power level 16, and includes a spell to ward off a witch-melting spell. Based on the attributes associated with each card, the witch effectively defeats the wizard in the game. The results of the battle are preferably stored in the database. The result may include lowering the wizard's power, commandeering the wizard's attributes by the witch, and possibly even death of the wizard itself. The witch card effectively "defeats" the wizard card, lowering its power and maybe life and health. The witch may also be effected, e.g., by lowering her power level according to the wizard's power level (e.g., 16−12=4).

If the results of the battle are maintained by the database 34, the card is effectively altered or rewritten. Even if the wizard and witch cards are traded, they still carry the same attributes that it was left with, as reflected in the database. In some games it may be advantageous to allow a character to be reconditioned, trained and even nursed back to health. Such actions can be reflected and/or maintained in the database 34.

Of course, this inventive aspect of the present invention is not limited to fantasy, roll-playing or adventure games. Other games benefit from interaction with digital watermarks as well. Consider a sports game. A player collects trading cards (e.g., basketball cards). The cards are digitally watermarked to include a unique identifier, which corresponds with a depicted athlete. The game player selects an "all-star" team according to the trading cards in his collection. The unique identifiers can be associated with athlete characteristics based on actual statistics, or based on relative or predetermined performance levels. A sports software game uses the athlete attributes when assigning ability, strength and accuracy to game characters. Trading cards from different seasons can be used to reflect an athlete's performance for that particular season. A player's ability can be changed, e.g., by changing data in a database, to reflect actual play throughout a session.

In a related sports implementation, the unique identifier is used to provide extra or super-human characteristics to a game athlete.

The dynamic features discussed in this section can be readily applied to the games discussed in other sections as well.

Many other games, including strategy games, board games, etc., will be enhanced by our inventive techniques.

Concluding Remarks

Having described and illustrated the principles of the technology with reference to specific implementations, it will be recognized that the technology can be implemented in many other, different, forms.

A different form may include a toy or game system that is designed to respond to digital watermarks embedded within audio and captured by a microphone.

It should be appreciated that a unique identifier as discussed above can be used to uniquely identifier a subset or set of characters, physical objects, etc.

Although the specification focuses on applications employing digital watermarking, certain of such applications can alternatively employ other data encoding techniques, including 1D and 2D barcodes, magnetic ink character recognition (MICR), optical character recognition (OCR), optical mark recognition (OMR), radio frequency identification (RFID), UV/IR technologies, hashing or fingerprinting, data glyphs, organic transistor, magnetic stripe, etc., depending on the particular application requirements. Although these other techniques may be used as alternative encoding schemes in some implementations, we note that digital watermarking has many, many advantages over these other techniques, including imperceptibility, orientation indicators, security when needed, copy detection via fragile watermarks, etc., etc., etc.

It should be appreciated that our use the term "computer game" is broad enough to include PC based computer games, hand-held computer games, board games having computer functionality, games played on game units and consoles or kiosks and arcades, and the computer executable software instructions that comprise such.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device). A computer game may also be implemented with hardware, or software-hardware implementations.

Instant messaging can be used as a communications channel between various gamers, to relay information, play games and interactively participate in a game. As an extension, a unique identifier, once decoded by a first gamer's appliance, can be communicated to a second user's appliance via instant message to facilitate interactive play.

To provide a comprehensive disclosure without unduly lengthening this specification, the above-mentioned patents and patent applications are herein incorporated by reference. The particular combinations of elements and features in the above-detailed embodiments are exemplary only; the interchanging and substitution of these teachings with other teachings in this application and the incorporated-by-reference patents/applications are also contemplated.

While certain digital watermark techniques are disclosed in this application and in the incorporated-by-reference patent documents, the present invention is not so limited. Other digital watermarking techniques may be suitably interchanged so long as they can convey a payload or message with sufficient capacity.

What is claimed is:

1. A method of playing a computerized game, the method comprising:
    receiving, via one or more processors, image or video captured with a camera, wherein the image or video represents a physical object, wherein the physical object comprises character attribute information repeatedly steganographically encoded therein, wherein the information is carried by the physical object through alterations to data representing at least some features carried by the physical object, and wherein the received image or video comprises a multi-bit representation of the character attribute information repeatedly steganographically encoded therein;
    decoding, via the one or more processors, the multi-bit representation of the character attribute information repeatedly steganographically encoded within the received image or video;
    interrogating, via the one or more processors, a database or storage location with at least some of the decoded information to obtain at least one character attribute associated with the decoded character attribute information;
    modifying, via the one or more processors, the at least one character attribute of a game character based upon the character attribute information;
    affecting, via the one or more processors, play of the computerized game based upon the modified at least one character attribute;
    decoding, via the one or more processors, the representation of the character attribute information steganographically encoded within a second image or video;
    interrogating, via the one or more processors, the database or storage location with at least some of the decoded information to obtain the at least one character attribute associated with the decoded character attribute information;
    modifying, via the one or more processors, the at least one character attribute of a game character a second time based upon the character attribute information and a number of times the physical object has been presented during a game session; and
    affecting, via the one or more processors, play of the computerized game based upon the second modified at least one character attribute.

2. The method of claim 1, wherein the physical object comprises a game card or character card.

3. The method of claim 1, wherein the information is steganographically encoded with digital watermarking.

4. The method of claim 1, further comprising:
    updating the at least one character attribute of the game character with a different value based upon game play;
    steganographically encoding character attribute information representing the updated value of the at least one character attribute of the game character in an image; and
    transmitting the image to a printer.

5. The method of claim 1, wherein the decoded information comprises a unique identifier, and wherein the unique identifier identifies the game character.

6. A system comprising:
    a physical object comprising character attribute information repeatedly steganographically encoded therein, wherein the character attribute information is carried by the physical object through alterations to data representing at least some features carried by the physical object;
    a capture device comprising a camera, wherein the camera is configured to capture image or video representing the physical object, wherein the received image or video comprises a representation of the multi-bit character attribute information repeatedly steganographically encoded therein; and wherein the capture device is configured to send the image or video to a processor;
    the processor; and a memory operably coupled to the processor comprising instructions that when executed by the processor perform the steps of:
    receiving the image or video;
    decoding the received image or video to decode the multi-bit representation of the character attribute information repeatedly steganographically encoded therein;
    interrogating a database or storage location with at least some of the decoded character attribute information to obtain at least one character attribute associated with the decoded character attribute information;
    modifying the at least one character attribute of a game character based upon the character attribute information;
    affecting play of the computerized game based upon the modified at least one character attribute;
    decoding the received image or video to decode the multi-bit representation of the character attribute information repeatedly steganographically encoded therein a second time;
    interrogating the database or storage location with at least some of the decoded character attribute information to obtain at least one character attribute associated with the decoded character attribute information;
    modifying the at least one character attribute of a game character a second time based upon the character attribute information and a number of times the physical object has been presented during a game session; and
    affecting play of the computerized game based upon the second modified at least one character attribute.

7. The system of claim 6, wherein a game console comprises the processor.

8. An apparatus comprising:
    a processor; a memory operably coupled to the processor comprising instructions that when executed by the processor perform the steps of to:
    receiving image or video captured with a camera, wherein the image or video represents a physical object, wherein the physical object comprises character attribute information repeatedly steganographically encoded therein, wherein the character attribute information is carried by the physical object through alterations to data representing at least some features carried by the physical object, and wherein the received image or video comprises a representation of the multi-bit character attribute information repeatedly steganographically encoded therein;

decoding the representation of the multi-bit character attribute information repeatedly steganographically encoded within the image or video;

interrogating a database or storage location with at least some of the decoded character attribute information to obtain at least one character attribute associated with the decoded information;

modifying the at least one character attribute of a game character based upon the character attribute information;

affecting affect play of the computerized game based upon the modified at least one character attribute;

decoding the representation of the character attribute information steganographically encoded within a second image or video;

interrogating interrogate the database or storage location with at least some of the decoded character attribute information to obtain at least one character attribute associated with the decoded character attribute information;

modifying the at least one character attribute of a game character a second time based upon the character attribute information and a number of times the physical object has been presented during a game session; and affecting play of the computerized game based upon the second modified at least one character attribute.

9. The apparatus of claim 8, wherein the apparatus is a game console.

10. The apparatus of claim 8, wherein the physical object comprises a game card or character card.

11. The apparatus of claim 8, wherein the information is steganographically encoded with digital watermarking.

12. The apparatus of claim 8, wherein the processor is further configured to:
update the at least one character attribute of the game character with a different value based upon game play;
steganographically encode character attribute information representing the updated value of the at least one character attribute of the game character in an image; and
transmit the image to a printer.

13. The apparatus of claim 8, wherein the decoded information comprises a unique identifier, and wherein the unique identifier identifies the game character.

14. An article of manufacture including a non-transitory computer-readable medium having instructions stored thereon that, when executed by a computing device, cause the computing device to perform the steps of:
receiving image or video captured with a camera, wherein the image or video represents a physical object, wherein the physical object comprises character attribute information repeatedly steganographically encoded therein, wherein the character attribute information is carried by the physical object through alterations to data representing at least some features carried by the physical object, and wherein the received image or video comprises a multi-bit representation of the character attribute information repeatedly steganographically encoded therein;

decoding the representation of the multi-bit character attribute information repeatedly steganographically encoded within the received image or video;

interrogating a database or storage location with at least some of the decoded character attribute information to obtain at least one character attribute associated with the decoded character attribute information;

modifying the at least one character attribute of a game character based upon the character attribute information;

affecting play of the computerized game based upon the modified at least one character attribute;

decoding the representation of the character attribute information steganographically encoded within a second image or video;

interrogating the database or storage location with at least some of the decoded character attribute information to obtain at least one character attribute associated with the decoded character attribute information;

modifying the at least one character attribute of a game character a second time based upon the character attribute information and a number of times the physical object has been presented during a game session; and affecting play of the computerized game based upon the second modified at least one character attribute.

15. The article of manufacture of claim 14, wherein the information is steganographically encoded with digital watermarking.

16. The article of manufacture of claim 14, wherein the physical object comprises a game card or character card.

17. The article of manufacture of claim 14, wherein the operations further comprise:
updating the at least one character attribute of the game character with a different value based upon game play;
steganographically encoding character attribute information representing the updated value of the at least one character attribute of the game character in an image; and
transmitting the image to a printer.

18. The article of manufacture of claim 14, wherein the decoded information comprises a unique identifier, and wherein the unique identifier identifies the game character.

19. The method of claim 1, further comprising:
creating the game character based on character attributes identified by the character attribute information.

* * * * *